March 27, 1956 — E. L. PRAGST — 2,739,425
REELED-STOCK FEED FOR SCREW MACHINES
Filed May 13, 1954
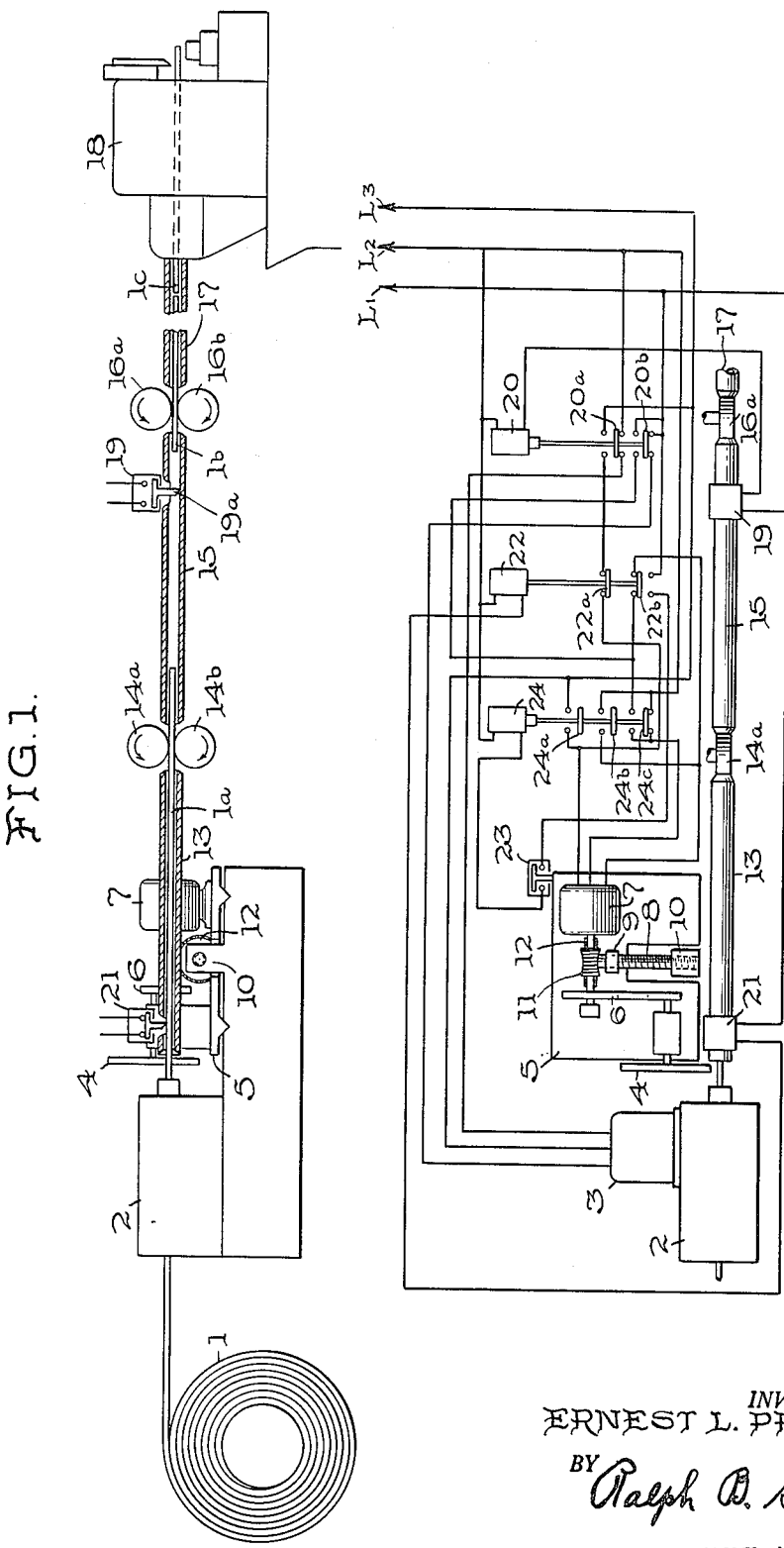
INVENTOR.
ERNEST L. PRAGST
BY Ralph B. Stewart
ATTORNEY

United States Patent Office 2,739,425
Patented Mar. 27, 1956

2,739,425

REELED-STOCK FEED FOR SCREW MACHINES

Ernest L. Pragst, Orange, Conn.

Application May 13, 1954, Serial No. 429,498

12 Claims. (Cl. 51—78)

This invention relates to devices for feeding stock to machine tools and in particular to a device for feeding wire stock from a supply reel to a machine, such as a screw machine.

In the past, it has been customary to utilize bar stock to feed automatic screw machines. Because the lengths of the bars are limited to that which is convenient to handle, an operator must give considerable attention to replacing the bars in the usual feed mechanism. By utilizing a feed mechanism which will feed reeled stock, the amount of attention required may be reduced to a minimum. A further saving will be realized from the lower cost of reeled stock as compared with bar stock.

It is therefore an object of my invention to devise a feed mechanism to feed reeled stock to machine tools which normally operate upon bar stock, such as automatic screw machines.

My invention embodies unwinding means for unwinding stock from the supply reel, and cut-off means for cutting off the unwound stock into uniform lengths. The severed length of stock is supplied to the screw machine automatically, and a sensing device controlled by the severed length of stock operates the unwinding and cut-off devices to cut off a new length of stock after the stock in the machine has been used up to a certain point. The feeding machine is entirely automatic in operation and will supply the screw machine with severed lengths of stock until the wire in the supply reel has been exhausted.

A preferred form of the invention is illustrated rather diagrammatically in the attached drawing, in which:

Figure 1 is a side elevational view with portions of the apparatus shown in section for the sake of clarity; and Figure 2 is a plan view of part of the apparatus and includes a schematic representation of one suitable electrical control system.

Wire stock 1a is unwound from reel 1 by straightener 2 which is of conventional construction and is driven by an electric motor 3.

Mounted adjacent the straightener 2 is a cut-off unit which may take any of several forms but preferably is of a form embodying an abrasive wheel such as wheel 4. This wheel is mounted upon a carriage 5 and driven through a belt drive 6 by electric motor 7 which is also mounted on the carriage. The cut-off wheel 4 may be moved across the path of the stock leaving the straightener 2 by sliding the carriage 5 in a direction at right angles to the axis of the stock. This is accomplished by means of screw 8 which is journalled in bearing 9 mounted on the carriage 5 and has threaded engagement with fixed post 10. The screw 8 is driven by motor 8 through worm 11 and worm wheel 12.

After leaving straightener 2 and passing the cut-off mechanism, the wire 1a passes through guide 13 and is engaged by a pair of constantly rotating drive rolls 14a and 14b. These drive rolls 14a and 14b are made of a suitable material, such as hardened steel, which will enable them to slip, when necessary, on the surface of the wire without wearing. After passing through a second guide 15, the stock is engaged by a second pair of constantly rotating drive rolls 16a and 16b, of similar construction to drive rolls 14a and 14b. The operation of the apparatus is such that the wire 1a will be severed by cut-off wheel 4 to form a length of stock, such as 1b, before it is advanced by drive rolls 14a and 14b sufficiently to be engaged by drive rolls 16a and 16b. After passing through a third guide 17, the wire enters the hollow spindle of machine 18, such as a conventional screw machine, where it is engaged by the usual feed fingers and automatically fed up against the stock stop incorporated in machines of this type. It is preferred that the distance between drive rolls 16a, 16b and the feed fingers of machine 18 be greater than the length of the severed portion 1b so that the wire portion 1c which is gripped by the feed fingers is not fed to the feed fingers directly by drive rolls 16a and 16b, but is pushed into machine 18 by the following length 1b.

The length of the cut-off sections 1b, 1c is determined by the position of a feeler switch 19 mounted on the tubular guide 15 intermediate the drive rollers 14a, 14b and the drive rollers 16a, 16b. This normally open switch is provided with an actuating finger 19a which extends into the guide 15 through an opening in the wall thereof and into a position such that the wire 1a actuates the switch to the closed position as the wire passes through the guide. Switch 19 controls the operation of relay 20 which in turn controls the energizing circuit of electric motor 3. When relay 20 is not energized (switch 19 open), it completes the circuit to supply power to electric motor 3.

The energizing circuit of motor 7 is controlled by three different switches and associated relays. Feeler switch 21 is a normally open switch similar to switch 19 but mounted on guide 13 near the end of the guide that is adjacent cut-off wheel 4. This switch controls the operation of relay 22. Limit switch 23 is a normally closed switch that is so mounted as to be held in the open position by carriage 5 when the carriage is in the normal position. Relay 24 is controlled by the combined effect of switch 23 and relay 22. The third switch affecting the operation of motor 7 is switch 19 and associated relay 20. Whenever relay 20 is de-energized it is impossible to complete the energizing circuit of motor 7. Switch 21, associated relay 22 and relay 24 control the direction of rotation of motor 7. When switch 21 is closed and relay 22 energized, relay 24 is de-energized and the energizing circuit of motor 7 is connected to operate motor 7 in a direction to cause carriage 5 to approach wire 1a. When switch 21 is open, relay 22 is de-energized, and if switch 23 is closed, relay 24 is energized and the energizing circuit connections to motor 7 are reversed. Relay 24 cannot be energized unless switch 23 is closed and relay 22 is de-energized. Thus, if switch 23 is opened by the return of carriage 5, relay 24 is de-energized and motor 7 is stopped.

When the cycle of operation begins, all switches are open and all relays are de-energized. Line L1 is connected to motor 3 through contactor 20b; line L2 is connected to motor 3 through contactor 20a; line L3 is directly connected to motor 3. When the advancing end of wire 1a closes switch 21, relay 22 is energized but the energizing circuit of motor 7 remains interrupted by relay 20. As soon as switch 19 is closed by the advancing end of wire 1a, lines L1 and L2 are disconnected from motor 3 at contactors 20a and 20b, thereby stopping motor 3. Line L1 is simultaneously connected to motor 7 through contactors 20b and 22b; line L2 is connected to motor 7 through contactor 24c; line L3 is connected to motor 7 through contactors 20a and 22a. Motor 7 then starts and drives carriage 5 towards wire 1a so that wheel 4 cuts off a length of wire. As the carriage is advanced towards wire 1a, switch 23 closes but relay 24 is not energized because relay 22 is energized and the circuit is interrupted at contactor 22b. After wire 1a has been cut off, the severed portion is advanced by drive rolls 14a, 14b until the forward end abuts the tail end of the preceding portion 1b. Switch 21 is opened as the tail end of the portion passes the switch. This de-energizes relay 22, completing the circuit from line L1 through contactor 22b, switch 23 and relay 24 to line L2, energizing relay 24. Line L1 is then connected to motor 7 through contactors 20b and 24c; line L2 is connected to motor 7 through contactor 24b; line L3 is connected to motor 7 through contactor 24a. This causes motor 7 to reverse and return carriage 5 to its normal position where the carriage opens switch 23 and de-energizes relay 24. The connections to motor 7 are then interrupted at contactors 22a and 22b, causing motor 7 to stop.

At this point the severed portions of wire are advanced by drive rolls 14a, 14b and 16a, 16b at a rate determined by the speed at which the portion 1c is used up by the machine 18. This portion 1c is being constantly urged forward by portion 1b, but the feed fingers of machine 18 govern the rate of advance. Consequently, drive rolls 16a, 16b will slip on wire portion 1b and drive rolls 14a, 14b will slip on the severed portion of wire 1a except when wire portion 1c is being advanced by the feed fingers. As the tail end of the severed portion of wire 1a passes feeler switch 19, the switch opens, de-energizing relay 20 and starting the cycle of operation over again. This cycle repeats itself until all the material in reel 1 has been fed through the apparatus. For the purpose of illustration, a small gap has been shown between severed portions 1b and 1c, but it will be understood that the adjacent ends of the two sections will be in contact with each other.

The relative distances between the various elements may be in any convenient relation so long as the distance between cut-off disc 4 and feeler switch 19 is not less than the distance between drive rolls 14a, 14b and 16a, 16b. Also, the distance between drive rolls 16a, 16b and the feed fingers of the screw machine should be greater than the distance between cut-off disc 4 and feeler switch 19. This arrangement results in the cut-off section clearing drive rolls 16a, 16b before it is gripped by the feed fingers of the screw machine. Thus, the wire section gripped by drive rolls 16a, 16b is not rotated by machine 18, but only the section which has passed to the right of the drive rolls. When this arrangement is used, the following cut-off section 1b serves as a pusher to feed the first section 1c into the feed mechanism of the screw machine.

While the preferred arrangement utilizes the screw machine feed mechanism to feed the material up against the stock stop in the machine 18, it is possible, if so desired, to eliminate the usual feed finger mechanism and have the cut-off section fed through the machine spindle and up against the stock stop solely by drive rolls 16a, 16b. In this case the wire portion 1c in the screw machine would be pushed by the wire portion 1b, and the advance of the portion 1c would be controlled solely by the opening of the collet of machine 18.

While I have given a detailed description of one form of my invention, it will be apparent to those skilled in the art that many modifications may be made in the apparatus without departing from the scope of the invention and I do not wish to limit myself to the particular embodiment described and shown herein.

I claim:

1. Apparatus for feeding reeled stock to a rotary-spindle machine tool comprising, means for unwinding said reeled stock, cut-off means disposed adjacent said unwinding means to cut off sections of said stock, stock-advancing means disposed between said cut-off means and said machine tool, a guideway to guide said stock from said unwinding means through said cut-off means, through said stock-advancing means and to said machine tool, and sensing means responsive to the presence of stock in said guideway at a point between said stock-advancing means and said machine tool to actuate said cut-off means and to stop said unwinding means.

2. Apparatus in accordance with claim 1 wherein said stock-advancing means comprises a pair of constantly rotating drive rolls frictionally engaging said stock on opposite sides thereof.

3. Apparatus according to claim 1 wherein said sensing means comprises an electric switch having an actuating member formed as a feeler finger positioned in said guideway to be operated by stock in said guideway.

4. Apparatus according to claim 1 and including second stock-advancing means disposed between said sensing means and said machine tool.

5. Apparatus in accordance with claim 1 wherein said unwinding means includes means for straightening said stock.

6. Apparatus for feeding reeled stock to a rotary-spindle machine tool comprising, means for unwinding said stock, cut-off means disposed adjacent said unwinding means to cut off sections of said stock, a pair of constantly rotating cooperating drive rolls disposed to engage said stock between said cut-off means and said machine tool, a second pair of constantly rotating cooperating drive rolls disposed to engage said stock between said first pair of drive rolls and said machine tool, means providing a guideway for guiding said stock between said two pairs of drive rolls, a feeler switch disposed intermediate said first pair of drive rolls and said second pair of drive rolls and having an actuating member arranged in said guideway so as to actuate said switch by the passage of said stock through said guideway, and means controlled by said switch to actuate said unwinding means in the absence of said stock in said guideway and to actuate said cut-off means and stop said unwinding means upon sensing the presence of said stock in said guideway.

7. Apparatus according to claim 6 wherein said cut-off means comprises an abrasive cut-off wheel.

8. Apparatus according to claim 7 wherein said abrasive wheel is mounted on a carriage, said carriage being movable in a direction transverse to the axis of said stock and including means to reverse the direction of motion of said carriage after said stock has been severed by said abrasive wheel, and means to arrest the return motion of said carriage after said abrasive wheel has cleared said stock.

9. Apparatus according to claim 8 wherein said reversing means comprises a feeler switch disposed intermediate said abrasive wheel and said first pair of drive rolls and having an actuating member arranged in said guideway so as to actuate said switch by the passage of said stock through said guideway.

10. Apparatus according to claim 8 wherein said arresting means comprises a limit switch disposed so as to be actuated by said carriage when said carriage has carried said abrasive wheel clear of said stock.

11. Apparatus for cutting off lengths of reeled stock comprising, means for unwinding said reeled stock, cut-off means disposed adjacent said unwinding means and having a cut-off member movable transversely of said stock to cut off sections of said stock, stock-advancing means disposed adjacent said cut-off means for advancing severed sections of said stock, a guideway to guide said stock from said unwinding means through said cut-off means and beyond said stock-advancing means, a first sensing means responsive to the presence of stock in said guideway at a point beyond said stock-advancing means to stop said unwinding means and to advance said cut-off member into cut-off position, and a second sensing means located at a point between said cut-off means and said stock-advancing means and responsive to movement of said severed section beyond said second sensing means to return said cut-off member to the inoperative position.

12. In apparatus for feeding stock to the rotary spindle of a machine tool having chucking jaws, the combination of a guideway aligned with said spindle for guiding stock into said spindle, means at one end of said guideway for feeding stock sections of predetermined length into said guideway in succession, and a pair of constantly rotating drive rolls frictionally engaging the stock in said guideway on opposite sides thereof and operating to move said stock into said machine, said drive rolls being spaced from the chucking jaws of said machine a distance greater than the length of a stock section, whereby the stock section engaged by said drive rolls acts as a pusher for the stock section engaged by the chucking jaws.

References Cited in the file of this patent

UNITED STATES PATENTS

| | | |
|---|---|---|
| 1,798,316 | Dreisbach | Mar. 31, 1931 |
| 2,069,623 | Pickhaver et al. | Feb. 2, 1937 |
| 2,445,167 | Dahl et al. | July 13, 1948 |
| 2,465,399 | Robinson | Mar. 29, 1949 |